F. E. Sickels,
Steam-Engine Valve-Gear.
No. 1112. Reissued Jan. 1, 1861.
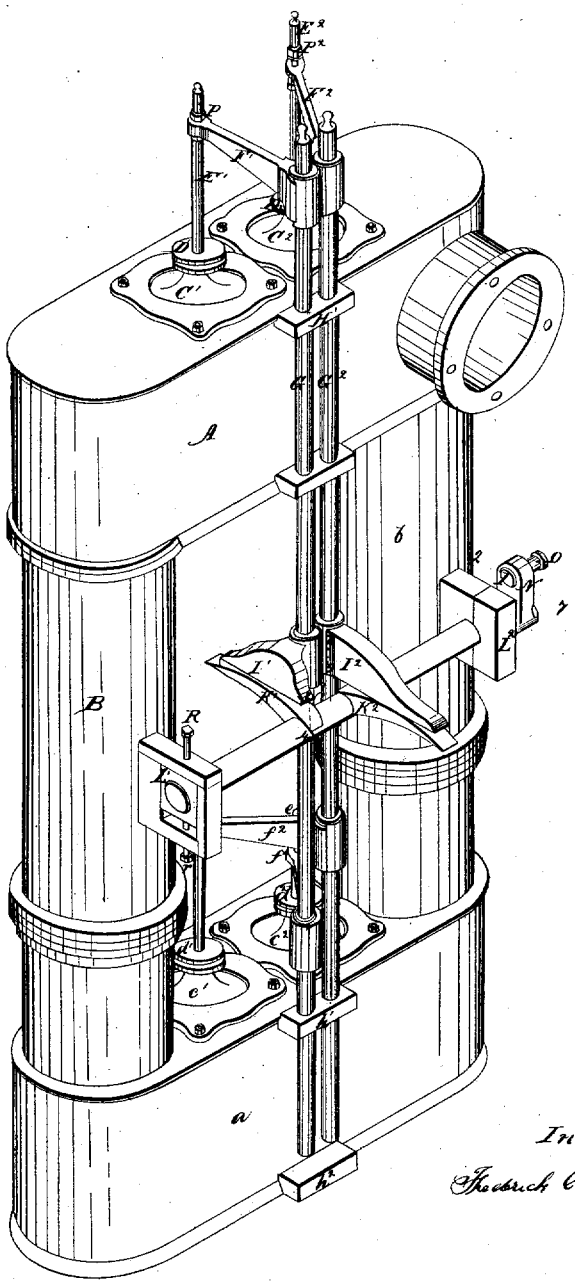
Witnesses
F. E. Sickels
F. J. Murphy
Inventor:
Frederick E Sickels
AM. PHOTO-LITHO. CO. N.Y. (OSBORNE'S PROCESS.)

UNITED STATES PATENT OFFICE.

FREDERICK E. SICKELS, OF NEW YORK, N. Y.

IMPROVEMENT IN THE METHOD OF OPENING AND CLOSING THE VALVES OF STEAM-ENGINES.

Specification forming part of Letters Patent No. 3,802, dated October 19, 1844; Reissue No. 1,112, dated January 1, 1861.

DIVISION A.

*To all whom it may concern:*

Be it known that I, FREDERICK ELSWORTH SICKELS, of the city of New York and State of New York, have invented a new and useful improvement on the apparatus for opening and closing the steam and exhaust valves of steam-engines, so that the steam will act with greater practical efficiency than it would without the improvement hereinafter practically described, it being of such a nature as to be easily and advantageously arranged for and applied to variously-arranged steam-engines.

Figure 1 is a drawing of the steam-chest, side pipes, and the apparatus immediately connected with and used to work the steam and exhaust valves of steam-engines as generally arranged for low-pressure double-valve beam-engines, excepting such parts as are altered for the purpose of showing my improvement hereinafter described.

In the accompanying drawing, A $a$ is the steam-chest. B $b$ are the side pipes. $C'$ $C^2$ $c'$ $c^2$ are the bonnets on the steam chest. $D'$ $D^2$ $d'$ $d^2$ are the stuffing-boxes for valve-stems. $E'$ $E^2$ $e'$ $e^2$ are the valve-stems. $F'$ $F^2$ $f'$ $f^2$ are the lifters. $G'$ $G^2$ are the lifting-rods. $H'$ $H^2$ $h'$ $h^2$ are the bearings for lifting-rods. $I'$ $I^2$ are the feet on lifting-rods. $K'$ $K^2$ are the toes on the rock-shaft. $L'$ $L^2$ are the bearings for rock-shaft. M is the rock-shaft. N is the rock-shaft arm. $P'$ $P^2$ are the upper valve-nuts on the upper steam and exhaust valve stems, the lower ones being similar, but not represented in the drawing. O is the rock-shaft pin, to which the eccentric rod is connected.

I will now describe the usual combination and arrangement, together with the usual mode of operating the heretofore-mentioned parts, in connection with the accompanying drawing, for the purpose of hereinafter more particularly showing the distinction between the usual mode and my mode of and improvement in arranging and combining them so as to produce new and useful results.

As the pin O moves in the direction from 7 toward 2, the toe $K^2$ acts upon the foot $I^2$ and causes it to rise, thereby opening the upper steam and lower exhaust valves, the valve-stem nuts being so placed upon the valve-stems as to cause the valves to open at the same time, or nearly so, the lifters commence to move; and by the movement of the pin O, returning in the direction from 2 toward 7, the foot $I^2$ lowers, causing the upper steam and lower exhaust valves to close, this taking place while the engine is completing one-half of its stroke, after which, continuing the motion of the pin O in the direction from 2 toward 7, the toes $K'$ $K^2$ being so placed upon the rock-shaft M in connection with the feet $I'$ $I^2$ that the toe $K'$ comes in contact with the foot $I'$ and causes it to rise and the upper exhaust and lower steam valves to open, the valve-stem nuts being placed, as before described, on the valve-stems; and by the movement of the pin O in the direction from 7 toward 2, returning, the toe $K'$ acts upon the foot $I'$, allowing it to lower and allows the upper exhaust and lower steam valves to close, this taking place while the engine is completing the other half-stroke, the pin O being moved by the agency of the eccentric of the engine.

It will be seen, therefore, from the foregoing description of the usual mode of opening and closing the steam and exhaust valves of steam-engines that while one lifting-rod with feet, lifters, and valves attached is in motion the other lifting-rod with its attachments remains stationary.

I will now describe the nature of my improvement, which consists in so regulating the periods of the movements of the valves as to leave the piston free to complete each stroke; also, to give any desirable lead to the exhaust-valves, and allow the piston to be in equilibrio near the completion of its stroke, (it not being absolutely necessary, if desirable, to give a lead to the steam-valves, as heretofore,) which is effected by opening the lower exhaust-valve before the end of the upward stroke of the pioton and before the upper exhaust-valve is closed, and opening the upper exhaust-valve before the end of the downward stroke of the piston and before the lower exhaust-valve is closed, the steam-valve being opened without a lead and after the exhaust-valve on the corresponding end of the cylinder has been closed.

My improvement further consists in a peculiar arrangement of the toes on the rock-shaft, feet on the lifting-rods, and the connection of the lifters with the valve-stems to carry into effect the above stated improvements.

The toes $K'$ $K^2$ are so placed, as represented in the drawing, in connection with the feet $I'$ $I^2$ so that before the toe $K^2$ has ceased to act upon the foot $I^2$ the other toe, $K'$, commences the raising of its foot $I'$, and so that before the toe $K'$ has ceased to lower its foot $I'$ the other toe, $K^2$, has commenced to raise its foot $I^2$. As, by the moving of the rock-shaft pin O in the direction from 7 toward 2 the foot $I'$ will commence to descend in the direction from 3 toward 4, and the foot $I^2$ to raise in the direction from 5 toward 6; then by a further motion of the pin O in the direction from 7 toward 2 after the toe $K'$ has allowed the foot $I'$ to complete its descent, the toe $K^2$ continues to raise the foot $I^2$; then by a motion of the pin O in the direction from 2 toward 7 in returning after the toe $K^2$ has allowed the foot $I^2$ to lower some distance, and during the progress of the foot $I^2$ downward, the toe $K'$ commences to act and raises the foot $I'$, this taking place during one half the revolution of the engine. By a further motion of the pin O in the direction from 2 toward 7 the toe $K'$ continues to raise the foot $I'$ after the toe $K^2$ has allowed the foot $I^2$ to complete its descent; then by the motion of the pin O in the direction from 7 toward 2 in returning the toe $K'$ allows the foot $I'$ to descend, and after the foot $I'$ has descended some distance and is yet on its downward motion the toe $K^2$ comes in contact with and commences to raise the foot $I^2$, this taking place during the other half revolution of the engine. The descent of one toe and one foot while the other is rising takes place at or near the center of the engine, the pin O being moved by the eccentric of the engine in the direction from 7 toward 2, as shown in the drawing, and also in the direction from 2 toward 7 in returning. The nuts attached to the stems of the steam-valves are so arranged as to be adjustable and allow a slip of the lifters operating thereon of an inch, more or less, and to be equal, or nearly so, to the rise of the toes above the upper surface of the rock-shaft.

Having thus far explained my improved combination and arrangement of the relative position of the toes and the feet, and also the effect which such combination has upon the motion of the toes and feet, I will now explain my improved combination of the relative position of the toes and feet and their connection with the steam and exhaust valves, and the improved effect which the whole of my combination and arrangement has upon the operation of such valves and the more efficient working of steam-engines.

As the pin O moves in the direction of from 7 toward 2, and while the toe $K^2$ acts upon the foot $I^2$ and raises it with the lower exhaust-valve, and while the toe $K'$ allows the foot $I'$ with the upper exhaust-valve to lower, the upper steam-valve remains unmoved in consequence of the position and arrangement of the valve-stem nut $P^2$ and the lifter $F^2$, as shown in the drawing, the under surface of the upper valve-stem nut, $P^2$, being placed so far above the lifter which acts upon it as the toe $I^2$ raises, while the toe $I'$ is descending by continuing the motion of the pin O in the direction from 7 toward 2. When the foot $I'$ has finished its motion and the upper exhaust-valve closes, the upper steam-valve opens in consequence of the lifter $F^2$ being brought in contact with the valve-stem nut $P^2$; then by the motion of the pin O in the direction from 2 toward 7 in returning, and as the upper steam-valve, closes the toe $K'$ comes in contact with the foot $I'$, raising it, at the same time opening the upper exhaust-valve, this taking place during half the revolution of the engine, and by continuing the motion of the pin O in the direction from 2 toward 7, and as the toe $K^2$ allows the foot $I^2$ to lower and the lower exhaust-valve to close, the toe $K'$ continuing to raise, the foot $I'$ continues the rise of the upper exhaust-valve, causing the lower steam-valve to open as the lifter $F'$ acts upon the nut of the stem of the lower steam-valve in the same manner as the upper lifter, $F^2$, acts upon the nut $P^2$ on the stem of the upper steam-valve, as hereinbefore described; and by continuing the motion of the pin O in the direction from 2 toward 7 the toe $K'$ continues to raise the foot $I'$ with the upper exhaust and the lower steam valves then in returning in the direction from 7 toward 2 it permits the upper exhaust and the lower steam valves to lower, and as the lower steam-valve shuts the lower exhaust-valve opens in consequence of the action of the toe $K^2$ on the foot $I^2$ and the connection of these valves as hereinbefore mentioned, this taking place during the other half-revolution of the engine. L is a movable bearing, supporting one end of the rock-shaft M, which is operated upon by screws R *r*, so as to raise or lower the rock-shaft, so as to vary or suspend the operation of my improved combination and arrangement hereinbefore described.

I have herein first described the usual mode of opening and closing the steam and exhaust valves of steam-engines, and lastly described my improved combination and arrangement and its mode of action.

I have also in this specification described my improved combination and arrangement of the apparatus for opening and closing steam and exhaust valves in steam-engines, as represented in the accompanying drawings, being well aware that there are various ways by which my combination can be applied to suit the differently-arranged engines now in use, all of which ways will involve the same mechanical principles.

The movable bearing in the drawing for modifying or suspending the operation of my improved combination can be made to raise and lower by means of a lever attached to it so as to be readily worked by the engineer when desired.

In engines having separate rock-shafts to open and close each valve a variation of the length of the connection between the respective rock-shafts, combined with the slip between the connections working the steam-valves, would constitute and be one method of carrying out my improved combination. Another mode is by placing pieces or cams upon the toes, or rock-shafts without toes, or by modifying the shape of the feet upon the lifting-rods, by placing cams thereon or otherwise, so as to operate in connection with the other parts described in the drawing.

In engines having one rock-shaft to work the steam-valves and another to work the exhaust-valves my improved combination would be produced by altering the position of the toes on the rock-shaft working the exhaust-valves, so as to be similar to the toes and rock shaft shown in the drawing, thereby causing the toes on the rock-shaft working the steam-valves to open them at the same time the steam-valves open with my combination and arrangement attached to the engine.

By means of my combination and improvement in the relative position of the toes on the rock-shaft with the nuts on the valve-stems of the steam-valves and their relative position to the valves as herein set forth any desirable lead may be given to the exhaust-valves without the piston of the steam-cylinder being subjected to any opposing force or difficulty in consequence thereof, which effect cannot be produced by any device heretofore known or used. Besides, both exhaust-valves may together be open for a desirable moment of time, so that the piston of the steam-cylinder shall be in equilibrio when it shall nearly have completed its stroke, thereby being enabled to shut a portion of the steam being exhausted in the steam-chest nearest the piston, that it may be used in combination with steam emitted from the boiler to drive the piston the return-stroke.

By the use of my combination the unequal application of force to the paddle-wheels, which communicates a sudden and alternate impetus as well as much tremulous motion, to a steamer, and which has more or less tendency to shake the engine out of line, will be in a great measure, if not wholly, overcome.

Having thus fully described the nature of my improvement in the combination of the toes attached to the rock-shaft with the nuts attached to the stems of the steam-valves, and the relative rise of the toes above the upper surface of the rock-shaft starting at the connecting point even with the upper surface, and the slip of the lifters upon the steam-valve stems, with the peculiar and relative operation of the valves for admitting to and exhausting steam from the cylinders of steam-engines in a more efficient and practical manner than by an means heretofore known or used, causing various parts of the engine to perform with much greater facility, thereby increasing speed or saving steam or fuel.

What I claim therein as new, and desire to secure by Letters Patent, is—

1. My improvement in the periods of the movements of the valves, by which they are opened and closed relatively to each other and to the movement of the piston, by means of which the piston completes each stroke in equilibrio, or nearly so, without admitting steam against the movement of the piston by a lead to the steam-valves, which is effected, as before stated, by opening the lower exhaust-valve before the end of the upward stroke of the piston and before the upper exhaust-valve is closed, and opening the upper exhaust-valve before the end of the downward stroke of the piston and before the lower exhaust-valves is closed, the movement of the steam-valves being so regulated as to admit steam to the cylinder only after the exhaust-valve on the corresponding end of the cylinder has been closed.

2. The arrangement of the toes and the rock-shaft in such a manner relatively to the location and form of the feet on the lifting-rods that at the middle or nearly so of the rocking motion of the rock-shaft, both lifting-rods with their exhaust-valves, shall be partly up, as herein described.

3. In combination with this arrangement, the slip of the lifters on the steam-valve stems, as described, to insure the closing of the exhaust-valves before the opening of the steam-valves on the corresponding ends of the cylinder, as herein described.

FREDERICK E. SICKELS.

Witnesses:
T. E. SICKELS,
T. I. MURPHEY.